US009298928B2

United States Patent
Borghetti et al.

(10) Patent No.: US 9,298,928 B2
(45) Date of Patent: *Mar. 29, 2016

(54) MOBILE DEVICE APPLICATION INTERACTION REPUTATION RISK ASSESSMENT

(71) Applicant: GLOBALFOUNDRIES INC., Grand Cayman (KY)

(72) Inventors: Stefano Borghetti, Etruschi (IT); Alessandro Donatelli, Rome (IT); Gianluca Della Corte, Rome (IT); Claudio Marinelli, Latina (IT); Antonio M. Sgro', Fiumicino (IT)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/477,055

(22) Filed: Sep. 4, 2014

(65) Prior Publication Data

US 2015/0106942 A1    Apr. 16, 2015

Related U.S. Application Data

(63) Continuation of application No. 14/053,005, filed on Oct. 14, 2013, now Pat. No. 9,098,707.

(51) Int. Cl.
*G06F 21/00* (2013.01)
*G06F 21/57* (2013.01)
*G06F 21/51* (2013.01)

(52) U.S. Cl.
CPC .............. *G06F 21/577* (2013.01); *G06F 21/51* (2013.01); *G06F 2221/033* (2013.01); *G06F 2221/034* (2013.01)

(58) Field of Classification Search
CPC combination set(s) only.
See application file for complete search history.

(56) References Cited

U.S. PATENT DOCUMENTS

| | | | |
|---|---|---|---|
| 2007/0240217 A1* | 10/2007 | Tuvell et al. | 726/24 |
| 2010/0056105 A1 | 3/2010 | Erhart et al. | |
| 2012/0110674 A1 | 5/2012 | Belani et al. | |

(Continued)

OTHER PUBLICATIONS

Di Cerbo et al., "Detection of malicious Applications on Android OS", Center for Applied Software Engineering, Free University of Bolzano-Bozen, Bolzano-Bozen, Italy, IWCF'10 Proceedings of the 4th international conference on Computational forensics, pp. 138-149, 2010.

(Continued)

*Primary Examiner* — Ghazal Shehni
(74) *Attorney, Agent, or Firm* — Scully Scott Murphy and Presser

(57) ABSTRACT

A computer processor receives rules associated with applications installed on a mobile device, and collects declared intents of the applications prior to execution of the applications. The computer processor generates possible combinations of declared intents of the applications and collects, by an intent proxy during execution, information associated with intercepted intents. The computer processor compares the information associated with each of the intercepted intents to the rules, wherein a match results in a first violation. The computer processor compares the intercepted intents to the possible combinations of the declared intents, wherein the intercepted intents other than the possible combinations of the declared intents results in a second violation. The computer processor displays a risk alert for the applications associated with either or both of the first violation and the second violation.

7 Claims, 4 Drawing Sheets

(56) References Cited

U.S. PATENT DOCUMENTS

2012/0324568 A1    12/2012  Wyatt et al.
2013/0298242 A1*  11/2013  Kumar et al. ................... 726/25

OTHER PUBLICATIONS

U.S. Appl. No. 14/053,005 entitled "Mobile Device Application Interaction Reputation Risk Assessment", filed Oct. 14, 2013.

* cited by examiner

MOBILE DEVICE APPLICATION INTERACTION REPUTATION RISK ASSESSMENT

BACKGROUND OF THE INVENTION

The present invention relates generally to the field of mobile device application security, and more particularly to determining the reputation of mobile device applications from dynamic interactions at run-time.

The volume of mobile devices used for business, personal and recreational activity continues to grow at impressive rates. Coinciding with the demand and growth in use of mobile devices is the large number of available applications (apps) that operate on the mobile devices, and significantly more that continue to be developed.

The large number of apps makes it difficult for a user to evaluate each app to determine which is the most appropriate, and users may not take time to do their own investigation before downloading apps to their mobile device. Users may elect to rely on sources describing the popularity, novelty, and implied necessity of an app, or directly observe an app on another user's mobile device, to make a decision on obtaining an app. This approach includes significant risk for the use of new apps and ignores the potential threat of malware delivery through downloaded apps.

Mobile devices provided by employers or used for business purposes may include "rules" governing the business approved handling and sharing of documents, data, and communications. The rules may serve to protect personal, sensitive or business/trade confidential information; however, rules add complexity to users' decisions of application download and use.

Users of mobile devices typically include a plurality of apps on a mobile device, each having a specific function or service it performs, which can be used directly by user activity, or by other applications, to complete a sequence of activities. Mobile devices use an operating system (OS), for example, Android™ OS (Android is trademark of Google Inc.). The Android™ OS uses "intents", which are asynchronous messages which allow applications (apps) to request functionality from other components of the OS or other applications. Its most significant use is in the launching of activities, where it can be thought of as the binding connection between activities.

Intent messaging is a facility for late run-time binding between components in the same or different applications. The intent itself is an intent object; a passive data structure holding an abstract description of an action to be performed. An intent object is a bundle of information containing the component name receiving the message, the action to be taken, service to be launched, or broadcast receiver to be active, and the data to act on. The action or service is a string that names the action to be performed or service to be launched. The data information is the universal resource identifier (URI) of the data to be acted on and the multipurpose internet mail extension (MIME) type of the data. If instead the requirements of an application can be specified by intent filters, an implicit intent can be used. The system then determines the best component or components to use, even if it is in a separate application or native to the OS.

Other operating systems may use similar techniques to enable interaction of applications making use of application specific function, to perform more complex activities.

Security is an important aspect of selecting apps to add to a mobile device. Apps that have a known history of use by multiple users and interaction with other apps without malicious activity, obtain a positive "reputation" indicating a level of security and behavior observed from experience. An app reputation includes an evaluation and possibly a rating from a security, privacy and malicious behavior perspective, to provide guidance to users considering purchase or download of an app. Failure to determine reputation issues before downloading an app may result in exposure of the mobile device to security, privacy, performance or other malicious issues.

BRIEF SUMMARY

Embodiments of the present invention disclose a method, computer program product, and system for determining a risk of a mobile application. A computer processor receives rules associated with applications installed on a mobile device. The computer processor collects declared intents of the applications installed on the mobile device prior to execution of the applications. The computer processor generates possible combinations of declared intents of the applications installed on the mobile device. The computer processor collects, by an intent proxy during execution of each of the applications installed on the mobile device, information associated with intercepted intents. The computer processor compares the information associated with each of the intercepted intents to the rules, wherein a match between the information of one or a combination of the intercepted intents and one or more of the rules results in a first violation. The computer processor compares the intercepted intents to the possible combinations of the declared intents, wherein the intercepted intents other than the possible combinations of the declared intents results in a second violation, and responsive to the result of either or both of the first violation and the second violation, the computer processor displays, on the mobile device, a risk alert for the applications associated with either or both of the first violation and the second violation.

DETAILED DESCRIPTION

Figure 1:
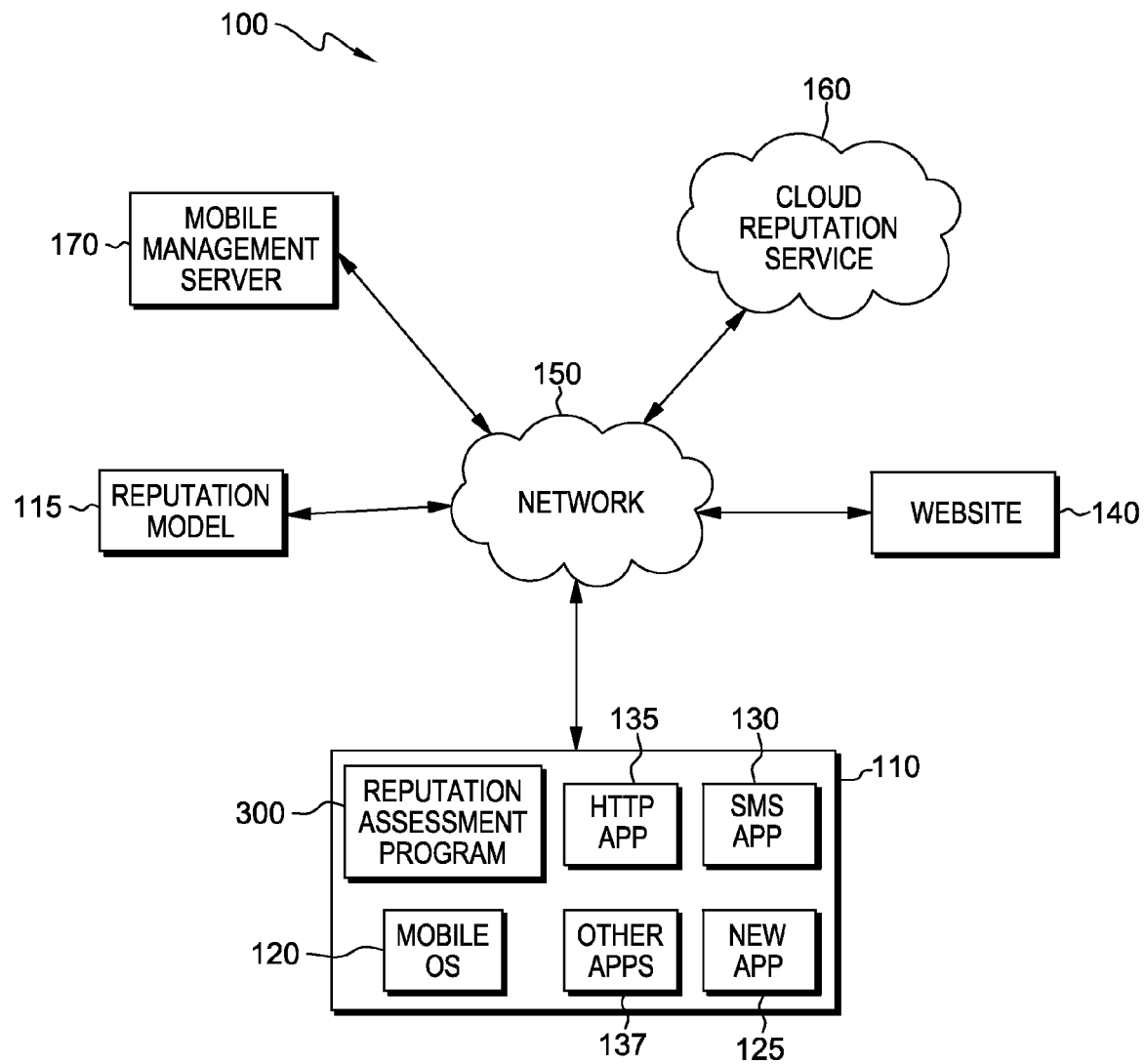
FIG. 1 is a functional block diagram illustrating a mobile device application processing environment, in accordance with an embodiment of the present invention.

Embodiments of the present invention recognize that applications typically operating on mobile devices, which use messaging objects to perform actions within an application or in combination with other applications, may result in actions that violate security or privacy rules guiding operation of the applications of the mobile device. Assessment of static operation of applications fails to detect interaction between applications at run time that may combine to violate guiding rules.

Embodiments of the present invention determine the installed applications on a mobile device with exposed or declared message objects, such as an "intent" in the Android™ OS. The possible interactions of the installed applications with exposed message objects are determined in a static representation, and as each application message object is initiated, it is analyzed by a message object proxy. The message object proxy, or for Android™ OS devices, the intent proxy, determines the component target of the intent and an action to be performed. The intent proxy compares the information from the intents to a static representation of intent interaction possibilities, and the rules governing application operations that are included within the reputation model of the mobile device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed application processing environment, generally designated 100, in accordance with one embodiment of the present invention. Application processing environment 100 includes mobile device 110, which is capable of receiving input from reputation model 115 via network 150, and which includes mobile operating system (OS) 120, new application (app) 125, hypertext transfer protocol (http) app 135, short message service (SMS) app 130, other apps 137, and reputation assessment program 300. Application processing environment 100 further includes website 140, mobile management server 170, cloud reputation service 160, all interconnected via network 150.

Network 150 can be, for example, a local area network (LAN), a wide area network (WAN) such as the Internet, or a combination of the two, and can include wire or wireless connections. In general, network 150 can be any combination of connections and protocols that will support communications via various channels between mobile device 110, reputation model 115, website 140, cloud reputation service 160 and mobile management server 170, of distributed application processing environment 100, in accordance with an embodiment of the present invention.

Website 140 is an internet destination capable of receiving communications and/or content from other computing devices connected to network 150. Website 140 can be hosted and supported by a web server computer, desktop computer, laptop computer, a specialized computer server, a client computer, tablet, or netbook personal computer (PC), a personal digital assistant (PDA), a smart phone, a mainframe computer, or a networked server computer. Further, website 140 can represent a website hosted and support by computing systems utilizing clustered computers and components to act as single pools of seamless resources when accessed through network 150, as is common in data centers and with cloud computing applications.

Cloud reputation service 160 is a service supported by one or more networked computers having internet access and providing a service that analyzes the stand-alone operation of an app prior to downloading the app on the intended hosting mobile device. The reputation service determines if the app exhibits behavior that may produce or contribute to malicious undesired activity when installed on a computing device, such as mobile device 110. Cloud reputation service 160 may be part of an app deployment process that a user may subscribe to for improved security and reliability of apps being considered for download, or an enterprise may include cloud reputation service 160 as part of a security or operational protocol for installation of apps on mobile devices used for enterprise purposes. Cloud reputation service 160 does not have information regarding other applications currently installed on the target mobile device, and only performs or accesses results of analysis with respect to the app being considered for download to the target mobile device.

Mobile management server 170 is a server connected to network 150 and may be used to control the deployment of apps to be downloaded to a mobile device. Mobile management server 170 may be used by an online retailer of apps, or may be a component of an enterprise deployment process of apps. Mobile management server 170 initiates a reputation assessment request to cloud reputation service 160 for an app to be downloaded to a user's mobile device, such as mobile device 110.

For example, a user requests a free-download app, or an app for purchase from an online source. The online source receives the request and engages mobile management server 170, which sends a query to cloud reputation service 160. Mobile management server 170 receives reputation feedback from cloud reputation service 160 indicating the behavior and security of the app, based on results of stand-alone testing performed on the app. The reputation feedback may be a standardized rating that indicates a level of risk that can range from low to high, and is associated with the download and use of the requested app. Alternatively, the reputation feedback can be one or more sets of descriptive text describing the behavior and security risk of the app as determined by assessment done by or accessible to cloud reputation service 160.

Mobile device 110 is a computing device capable of downloading one or more apps via network 150. Mobile device 110 can be a laptop computer, a specialized mobile computer server, a tablet, or netbook personal computer (PC), a personal digital assistant (PDA), a smart phone, or any computing device capable of downloading and operating an app from a network connection. In general, mobile device 110 is representative of any programmable electronic device or combination of programmable electronic devices capable of executing machine-readable program instructions. Mobile device 110 may include internal and external hardware components, as depicted and described in further detail with respect to FIG. 4.

Mobile device 110 is in communication with reputation model 115 which includes data representing rule descriptions that are not to be violated by the operation of one or a combination of apps. In one embodiment of the present invention, reputation model 115 is comprised of one or more data files that include rule descriptions. The rule descriptions are established via a user-settings option, in which the user selects or inputs specific rules associated with actions that one or a combination of apps must not perform. In another embodiment of the present invention, the rules included in reputation model 115 are received from an enterprise organization source, and the rules received reflect the security and behavior interests of the enterprise organization as applied to the mobile device to be used for enterprise related activity. The rules included in reputation model 115 are used as reference to determine if the action of an app intent or combination of intents of multiple apps may result in a violation of one or more rules.

Mobile OS 120 is the operating system for mobile device 110. The operating system includes the programmable instructions that operate a smart phone, tablet, PDA, or other digital mobile device. Current mobile operating systems combine the features of a personal computer operating system with other features, such as software features for utilizing a touch screen, cellular communications, Bluetooth, Wi-Fi, GPS mobile navigation, digital camera, digital video camera, digital video player, speech recognition, voice recorder, and an MP3 music player. Examples of a mobile OS include, but are not limited to iOS by Apple Inc. (iOS is an mobile operating system of Apple Inc.) and Android™ mobile operating system owned by Google (Android is a trademark of Google Inc.).

Mobile device 110 is depicted as including three specified apps, new app 125, SMS app 130, and HTTP app 135, and other apps 137. Other apps 137 includes all other applications installed on mobile device 110. New app 125 is an application that has been recently installed by downloading via network 150 to mobile device 110. In an exemplary embodiment of the present invention, new app 125 includes actions requesting information from other applications, and also includes actions that request another application to send the information obtained to recipients external to the mobile device SMS app 130 is an existing application on mobile device 110 and in an exemplary embodiment of the present invention, SMS app 130 is a short message service (SMS) application that stores and manages SMS messages that have been sent from or received by mobile device 110. HTTP app 135 is also an existing application on mobile device 110 and is capable of performing actions to send content from mobile device 110 to an external recipient by use of hypertext transfer protocol (HTTP), and receive content sent to mobile device 110 via a network connection.

Figure 3:
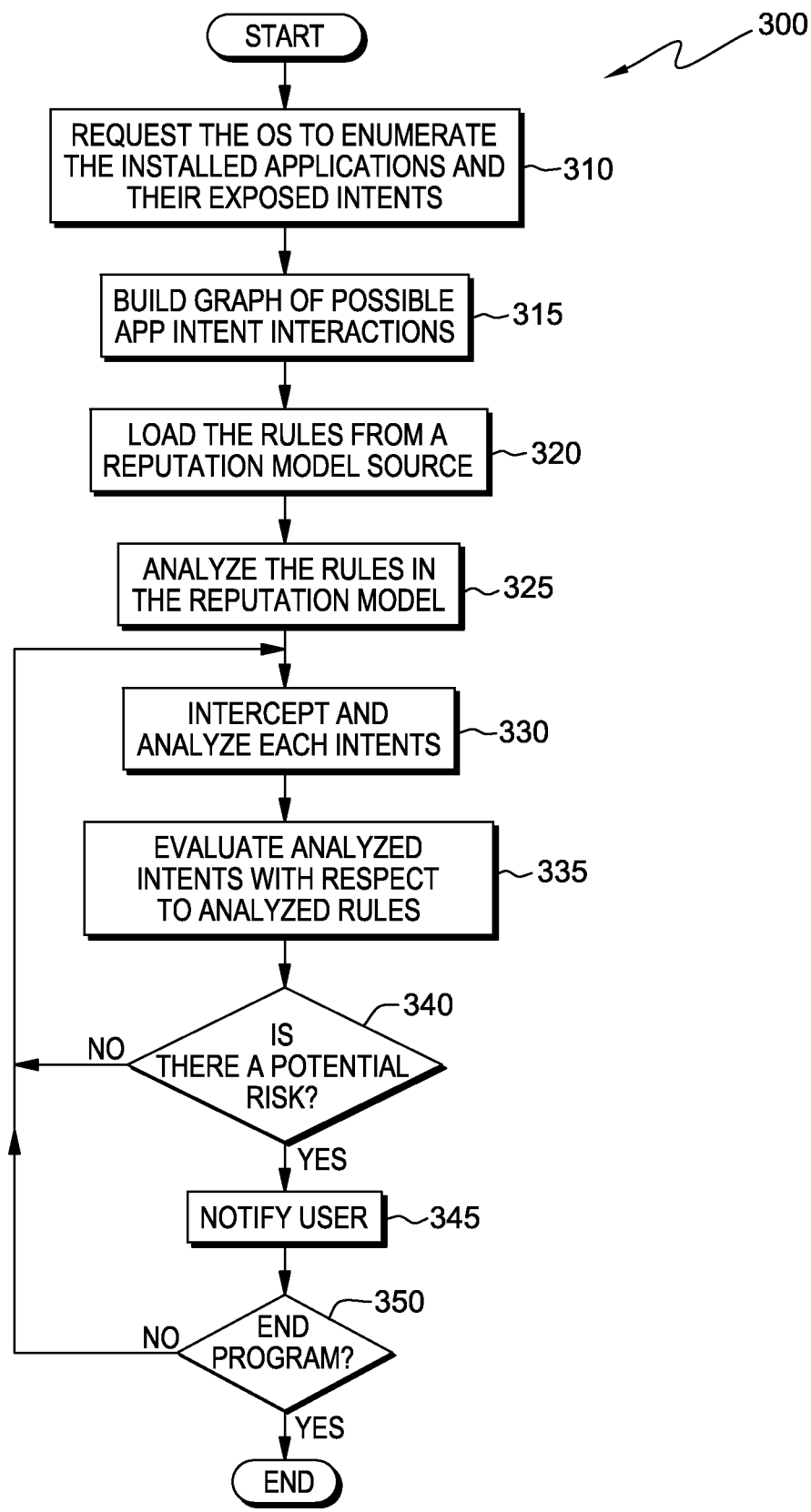
FIG. 3 illustrates a flowchart of a reputation assessment program, inserted on a mobile device within the mobile device application processing environment of FIG. 1, in accordance with an embodiment of the present invention.
Figure 4:
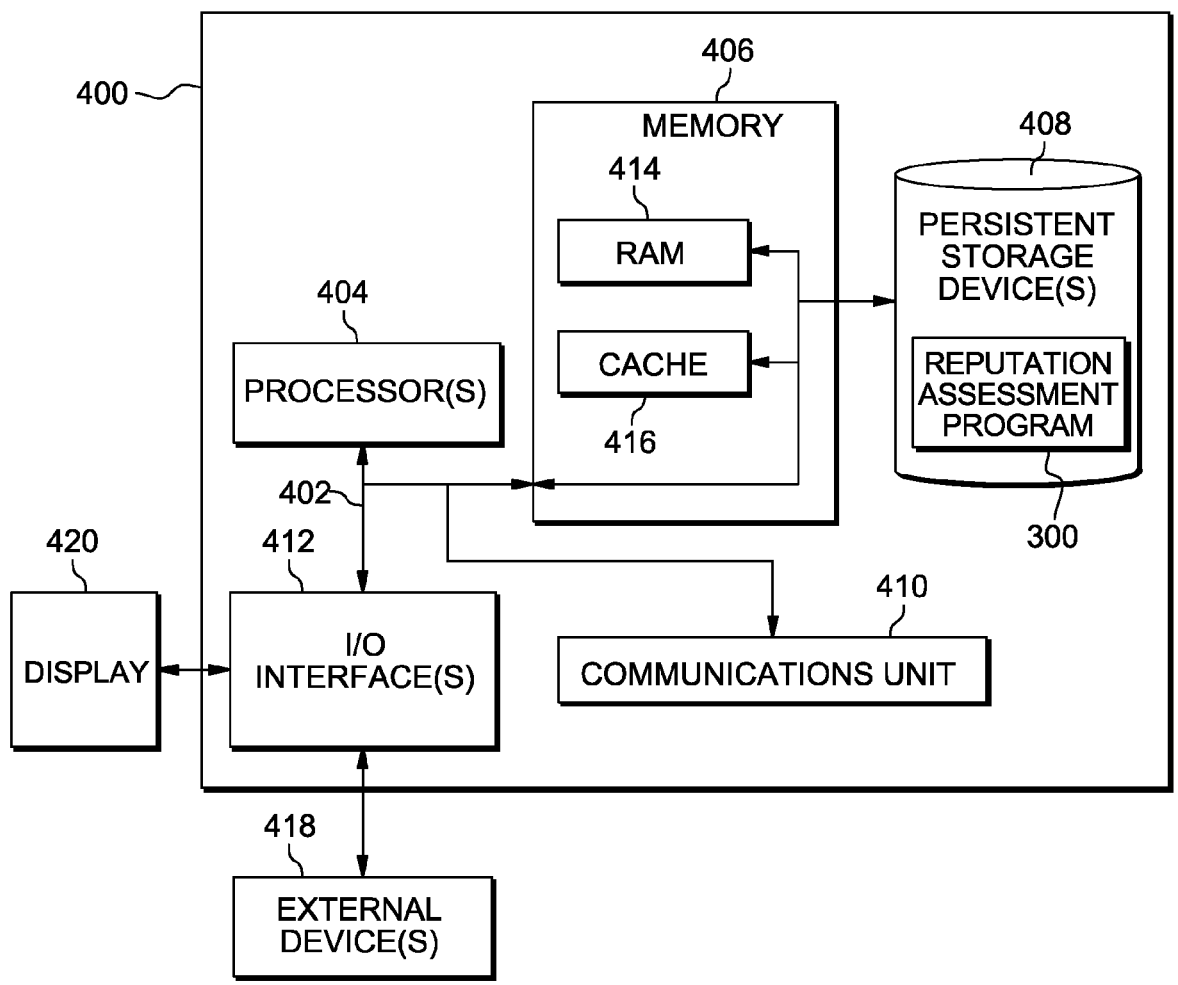
FIG. 4 depicts a block diagram of components of a device executing the reputation assessment program, in accordance with an embodiment of the present invention.

Mobile device 110 is also depicted as including reputation assessment program 300, stored on persistent storage medium of mobile device 110, which is discussed further with respect to FIG. 4. Reputation assessment program 300 operates as a "background" application, in which it operates continually to monitor the intents of applications as they are initiated. Reputation assessment program 300 analyzes the actions of initiated intents both individually and in combination, and compares the initiated intents to previously determined potential interactions from the declared intents of applications on mobile device 110. Reputation assessment program 300 determines which potential intent interactions can occur based on the initiated intents. Reputation assessment program 300 uses rules that are received from reputation model 115, and determines if individual or combinations of initiated intents can violate one or more of the rules of reputation model 115. In response to determining that a rule is or can be violated, reputation assessment program 300 displays a warning message indicating the apps involved and the rule that may be violated. The details of the operation of reputation assessment program 300 are discussed with respect to FIG. 3.

Figure 2:
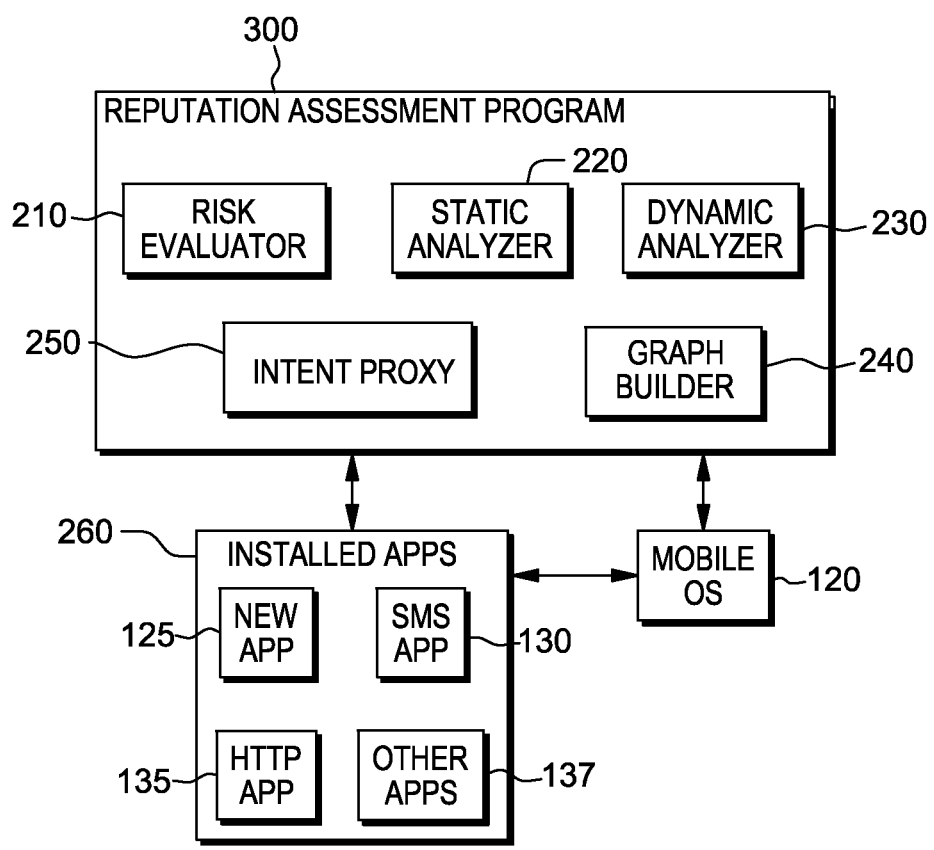
FIG. 2 is a block diagram depicting the components of a reputation assessment program, on a mobile device within the application processing environment of FIG. 1, for determining the risk level of an application, in accordance with an embodiment of the present invention.

FIG. 2 is a block diagram depicting components of reputation assessment program 300, on a mobile device within the application processing environment of FIG. 1, for determining the risk level of an application, in accordance with an embodiment of the present invention. The components of reputation assessment program 300 include risk evaluator 210, static analyzer 220, dynamic analyzer 230, graph builder 240, and intent proxy 250, which interact with installed apps 260, and mobile OS 120.

In one embodiment of the present invention, the installation of new app 125 on mobile device 110 triggers reputation assessment program 300 to request the declared intent filters from mobile OS 120, which include the exposed services of the apps installed on device 110. In other embodiments, reputation assessment program 300 is launched on the startup of mobile device 110 and operates in the background, and collects the declared intents and intent filters of all the installed applications on mobile device 110. The declared intent filters specify the types of intents that an action, service, or broadcast receiver of an application can respond to. An intent filter declares the action or service that its parent component can perform, and/or what types of broadcasts a receiver can handle. The intent filter opens the component to receiving the declared types of intents, while filtering out those that do not apply to the component. Intent filters also allow other apps to start an app activity. When an app is installed on a device, the OS identifies the app's intent filters and adds the information to an internal catalog of intents supported by all installed apps. When an app calls for the start of an activity with an implicit intent, the system finds the one or more activities that can respond to the intent.

Graph builder 240 receives the static declared intents and intent filters of the installed applications and the initiated intents and intent filters from the dynamic analyzer, and builds a representation of the possible combinations for the interactions of intents between the installed apps of mobile device 110. The representation includes the connection levels, otherwise understood as the number of connections between apps, or combinations of intents, which may be perceived as a graph in which the vertices represent apps and the edges connecting vertices represent requests of intents or intent filters. The number of connections between apps that result in a completed activity or operation is the connection level and can be considered an indicator of the level of complexity in performing the activity or operation. For example, an activity or operation that would require sending and receiving intents between four apps is more complex than an activity that can be completed by a single app or between two apps. The higher the number of connections between apps to complete an activity or operation, the lower the risk level as determined by risk evaluator 210.

Intent proxy 250 is a module of reputation assessment program 300 and works in conjunction with mobile OS 120. Intent proxy 250 is an intermediate layer that intercepts intents as they are initiated and determines the activity, service, or broadcast receiver action to be taken, and the component targeted by the intent, or the possible components to receive and act on the implicit intent. Intent proxy 250 acts as a run-time tracker of application intents. For example, new app 125 is launched and an intent is initiated which is received by intent proxy 250. Intent proxy 250 determines the intent is requesting message content from SMS app 130. After receiving and determining the activity of the intent, intent proxy 250 allows the intent to continue to the designated application component.

Risk evaluator 210 is a module of reputation assessment program 300 and receives the analyzed actions associated with the intents as analyzed by static analyzer 220 and dynamic analyzer 230. Risk evaluator 210 also receives rules from reputation model 115 that are compared to the results from static analyzer 220 and dynamic analyzer 230 to determine if one or more rules may be violated by the intent activity requests of one or a combination of applications. Each rule received from reputation model 115 defines one or more activities or operations that are denied and are not to be performed by mobile device 110. Denied activities include one or more intent actions from one or more applications and results in a violation of the rule. Risk evaluator 210 uses the representation of combinations of intents produced by graph builder 240 to determine the level of risk and provide a risk alert index that in one embodiment of the present invention, is displayed to a user of mobile device 110 upon violation of a rule. A higher number of intent combinations to perform an activity or operation results in a lower risk value for the risk alert index.

In an exemplary embodiment of the present invention, rules for a mobile device are established by an enterprise organization that issues the mobile device to a user. One of the rules established by the enterprise organization states that a mobile device, for example mobile device 110, is not to send or forward short message service messages that have been received, to recipients external to the mobile device. In one embodiment of the present invention, the rule is received by risk evaluator 210 from reputation model 115 during initial setup of the mobile device. An app is downloaded and the declared intents of the app are determined, analyzed against graph builder 240 information, and sent to risk evaluator 210. Risk evaluator 210 determines whether the intents of an individual app, or if the intents requesting action from other apps in combination, violate one or more rules.

In another embodiment, the rules may be established by a user accessing a setup function of reputation assessment program 300, which inputs the rules to risk evaluator 210 directly.

Static analyzer 220 is a module of reputation assessment program 300 and receives information including the intents associated with apps on mobile device 110 from graph builder 240, based on the declared intents identified by intent proxy 250. Static analyzer 220 analyzes the declared intents of each app independent of the intents of other apps, and determines the actions associated with the intents of each app. The action information is sent to risk evaluator 210 to determine if the intent actions of an app or a combination of apps potentially violate a rule of reputation model 115 (FIG. 1).

Dynamic analyzer 230 is a module of reputation assessment program 300 and receives information from intent proxy 250 and graph builder 240, based on the initiated intents of application on mobile device 110. Dynamic analyzer 230 analyzes the intents of apps requesting intents of other apps, thereby determining the run-time interaction of intents from multiple apps. The initiated intent activity information is sent to risk evaluator 210 to determine if the intent activities of an app potentially violate a rule received from reputation model 115.

Intents are abstract descriptions of an action and the descriptive attribute of the intent or combination of intents, enables a comparison to keywords of a rule. For example, a rule may state: "SMS+Internet=denied", meaning that SMS content is not allowed to be sent via the Internet. App 1, app 2 and app 3 are installed on mobile device 110, and app 1 raises an intent request to app 2 to obtain SMS messages. The app 2 intent to obtain SMS messages includes "SMS" and is allowed. App 2 raises an intent to request app 3 to send content using "HTTP", and the intent for app 3 includes "HTTP" which has an associated keyword of "Internet". Risk evaluator 210 compares the combination of the intent descriptions and associated keywords as analyzed by dynamic analyzer 230, to the rule received from reputation model 115, and determines that performing the intents that involves a dynamic combination of applications, is a violation of the rule.

FIG. 3 illustrates a flowchart of reputation assessment program 300, inserted on a mobile device within the mobile device application processing environment of FIG. 1, in accordance with an embodiment of the present invention. In one embodiment of the present invention, reputation assessment program 300 is installed on a mobile device, for example, mobile device 110. In another embodiment, reputation assessment program 300 is downloaded along with the download of an app to mobile device 110. Reputation assessment program 300 requests the operating system (OS) to enumerate the installed applications and their exposed intents (step 310). Reputation assessment program 300 is initiated and sends a request to the mobile device OS to enumerate the applications and exposed intents that are installed on the mobile device. Exposed intents, otherwise referred to as declared intents, indicate the actions that an application requests or accepts.

For example, reputation assessment program 300, operating on mobile device 110, sends a request to mobile OS 120 to enumerate the installed applications and their respective exposed intents. The response to the request produces a listing of the declared intents associated with each application, for example, the declared intents for SMS app 130, HTTP app 135, new app 125, and other apps 137.

Using the enumerated results of the declared intents for the installed applications, reputation assessment program 300 builds a graph of possible app intent interactions (step 315). Reputation assessment program 300 builds a representation of possible interactions between declared intents of the installed applications. The representation is best perceived as a mathematical graph of vertices interconnected with edges, in which the vertices represent the applications and the edges represent the intents. The graph of the interactions is a reference used to identify possible application intent activities or interaction of activities based on the initiated intents of applications loaded on mobile device 110, as determined by dynamic analyzer 230 and static analyzer 220. The graph includes the possible or potential interactions of intents from one application that may request an activity of one or more other applications. In addition, a series of intents involving multiple applications may be sequenced together to complete an activity, which can be the result of one or multiple intent actions. The graph indicates the number of intents that must interact for the completion of an activity, thereby indicating the complexity of the activity and the likelihood of the activity occurring.

For example, new app 125, SMS app 130, HTTP app 135 and other apps 137, are loaded on mobile device 110. Reputation assessment program 300 requests the OS to obtain a listing of declared intents from all apps loaded on mobile device 110. The list of declared apps is received by graph builder 240, which creates a representation of the possible interactions of the declared intents of the loaded applications. One interaction determined by graph builder 240 includes intents from new app 125, SMS app 130, HTTP app 135 and other apps 137. The action descriptions of the intents of these apps is compared to the keywords of the rules by risk evaluator 210 and a combination of the intents from new app 125, SMS app 130 and HTTP app 135 are found to match and violate a rule. The complexity considers the number of intents and apps interacting to violate the rule.

Reputation assessment program 300 loads the rules from a reputation model source (step 320). A reputation model, such as reputation model 115, includes one or more rules that apply to allowing or preventing actions by one or a combination of intents, typically done for protection or intended limitation. In one embodiment of the present invention, reputation model 115 is external to the mobile device hosting reputation assessment program 300, and includes rules provided by a provider of the mobile device or a service to which the device subscribes. In another embodiment, the reputation model is a setting function accessed from the mobile device, from which a user or administrator of the mobile device inputs rules. Reputation assessment program 300 receives the rules from reputation model 115 and loads the rules to risk evaluator 210.

For example, a set of rules are defined by the enterprise provider of mobile device 110 and are loaded and stored in reputation model 115. Reputation assessment program 300, operating on mobile device 110, receives the set of rules from reputation model 115, which is external to mobile device 110, and loads the set of rules into risk evaluator 210.

Having loaded the rules, a risk evaluator module of reputation assessment program 300, such as risk evaluator 210, analyzes the rules in the reputation model (step 325). In one embodiment of the present invention, the analysis of each text-based rule involves text analytics, which determines keywords or phrases that are associated with intent action descriptions and may include string syntax text similar to intent action descriptions, and additionally indicates denial or approval of the one or more intent actions. The one or more actions may include the action of a single intent, a combined action of multiple intents of a single application, or may be a combination of multiple intents from multiple applications.

For example, reputation assessment program 300 loads the rules from reputation model 115 to risk evaluator 210. Risk evaluator 210 analyzes the text content of the rules, producing keywords and phrases that are descriptive of the rule, including text indicating if the activity described by the keyword(s) is not allowed. An analyzed rule may include "PRIVATE KEY+HTTP: N" and may be interpreted by risk evaluator 210 as requests involving a private key and requests for use of HTTP transport via the Internet, is not allowed. The rules and the action description of intents may include the use of one or more of: acronyms, common abbreviations, numerals, symbols, alphabetic characters, non alphabetic characters.

Reputation assessment program 300 initiates an intent proxy which monitors initiation of intents. Upon the initiation of an intent, reputation assessment program 300 intercepts and analyzes each intent (330). An intercept proxy tracks intents as they are initiated, and obtains the intent information to pass on to dynamic analyzer 230, which further determines an identity of the intent application, an action description of the intent, and a component target or an implicit filter of the intent. Reputation assessment program 300 uses an intent proxy, such as intent proxy 250, to track and obtains information associated with each initiated intent. The information is used by dynamic analyzer 230 to determine the possible application intent interactions that may occur based on the intents information provided by intent proxy 250 and the possible interactions identified by graph builder 240.

For example, reputation assessment program 300 includes a module, intent proxy 250 which monitors initiation of intents from applications loaded on mobile device 110. Intent proxy 250 intercepts an intent from new app 125 and obtains information associated with the intent, including the application sending the intent request, the activity description, data, the component target of the intent, which may be a request to another app. New app 125 sends a request intent to SMS app 130 to obtain message content. SMS app 130, receiving the intent request from new app 125, in response sends an intent request to HTTP app 135 to send content via the Internet to a designated destination. Intent proxy 250 sends the intercepted intent information to dynamic analyzer 230. In one embodiment of the present invention, if the intent is sent from an application not included in the representative graph produced by graph builder 240, intent proxy 250 initiates a new request to OS 120 to send all declared intents of apps loaded on mobile device 110 to update the graph representing possible interactions of intents and applications produced by graph builder 240. If the intent intercepted by intent proxy 250 is not included in the updated graph of declared intents, a risk alert results.

Reputation assessment program 300 evaluates analyzed intents with respect to the analyzed rules (step 335). The intents analyzed by dynamic analyzer 230 and results from static analyzer 220, are sent to risk evaluator 210 to compare to the analyzed rules. Risk evaluator 210 compares the analyzed action descriptions of one or combinations of intents, which results in keyword(s) and/or phrases associated with the intents, to the analyzed rules which produces keyword(s) and/or phrases associated with the rules. Risk evaluator 210 identifies matches between the analyzed intents and analyzed rules and if a match is found, determines the amount of risk, based on the number of intents and applications that must interact to result in an activity that violates a rule, producing a risk. Risk evaluator 210 generates a risk alert index value.

For example, analyzing intents from static analyzer 220 and dynamic analyzer 230 involves identifying keywords associated with the action descriptions of the intents. The intents are compared with the possible interactions from the graph of graph builder 240 to identify the possible interactions to be considered, based on the intents intercepted by intent proxy 250 and analyzed by dynamic analyzer 230. The keywords of the intent actions are compared to the keywords of the analyzed rules by risk evaluator 210. The intent for new app 125 includes keywords of "SMS; GET; MESSAGES". The intent from SMS app 130 includes the keywords of "SEND; MESSAGES; HTTP; URI XXX". Risk evaluator 210 compares rules keywords "SMS; SEND; MESSAGES; HTTP; N", to the keywords of the intents and matches the combination of intents to the rule that denies the activity (N=no). If a match is determined, risk evaluator 210 determines the complexity of the interactions and generates a risk alert index value associated with the application sending the initial intent request, and based on the number of intents and applications involved to complete the activity.

The risk alert index value is generated by risk evaluator 210 based on the number of intents and applications involved to complete the activity initiated. If an activity requires intent request from a sequence of four different apps, the complexity of the interactions is greater than an activity that requires one intent from two different apps. The risk alert index value is inversely related to the number of interactions required to complete an activity that violates a rule. The greater number of interactions required to complete the activity indicates a lower probability of the action occurring and therefore a lower risk alert index value, whereas a lower number of interactions required to complete the activity indicates a higher probability of the action occurring and therefore a higher risk alert index value.

Reputation assessment program 300 determines if there is a potential risk. Determining that a potential risk exists (decision step 340, "Yes" branch), reputation assessment program 300 initiates an alert for mobile device 110 and to notify the user (step 345). The alert may be a visual display that includes the risk alert index value, the identity of the applications involved in the risk, and may include options for the user of mobile device 110 to mitigate the risk. The risk alert may also include one or more of: an audible alert, an audible message, and a vibration alert.

Reputation assessment program 300 monitors to detect a command to terminate. Determining a command to end reputation assessment program 300 has been given, reputation assessment program 300 ends (decision step 350, "Yes" branch). If reputation assessment program does not detect a command to end, reputation assessment program 300 continues to monitor for initiation of intents and intercepts and analyzes each intent (return to step 330).

FIG. 4 is a block diagram depicting components of mobile device 400, capable of executing reputation assessment program 300, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Mobile device 400 includes communications fabric 402, which provides communications between processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Reputation assessment program 300 and OS 120 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of application assessment environment 100. In these examples, communications unit 410 includes one or more network interface cards. Communications unit 410 may provide communications through the use of either or both physical and wireless communications links. Reputation assessment program 300 and mobile OS 120 may be downloaded to persistent storage 408 through communications unit 410.

I/O interface(s) 412 allows for input and output of data with other devices that may be connected to external devices and/or resources of distributed application processing environment 100. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., reputation assessment program 300 and mobile OS 120 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining a risk of a mobile application, the method comprising:
   receiving rules associated with applications installed on a mobile device, wherein each rule defines one or more actions that, if detected, generates an alert;
   collecting declared intents of the applications installed on the mobile device prior to execution of the applications;
   generating possible combinations of the declared intents collected from the applications installed on the mobile device;
   collecting, by an intent proxy during execution of each of the applications installed on the mobile device, information associated with intercepted intents, wherein the information collected by the intent proxy includes a component of the mobile device to which an intent is directed, and an action to be performed by the intent;
   comparing the information associated with each of the intercepted intents to the received rules, wherein a match between the information of one or a combination of the intercepted intents and one or more of the received rules, results in a first violation;
   comparing the intercepted intents to the possible combinations of the declared intents, wherein either an intercepted intent that is not a declared intent, or a combination of the compared intercepted intents that is not one of the possible combinations of the declared intents, results in a second violation; and
   responsive to the result of either or both of the first violation and the second violation, displaying, on the mobile device, a risk alert for one or more of the applications installed on the mobile device that are associated with either or both of the first violation and the second violation.

2. The method of claim 1, wherein comparing the information associated with each of the intercepted intents to the rules, comprises:
   analyzing the rules by use of text analytics to determine a string syntax for each of the rules; and
   analyzing the information associated with the intercepted intents by use of text analytics, wherein the information includes an action description for each of the intercepted intents, to determine a string syntax for each action description.

3. The method of claim 1, wherein each of the rules and each of the declared intents and intercepted intents, includes one or a combination of: keywords, key phrases, acronyms, numerals, symbols, and characters.

4. The method of claim 1, further comprising:
   determining a risk alert index value, wherein the risk alert index value is based inversely on a number of the intercepted intents that combine to complete an activity that violates one or more of the rules, whereby a larger number of the intercepted intents that combine to complete the activity that violates one or more of the rules results in a lower risk for the risk alert index value.

5. The method of claim 1, wherein generating possible combinations includes generating a connection level, based on a number of connections between applications that results in a completed activity or operation.

6. The method of claim 1, wherein displaying the risk alert for the applications associated with either or both of the first violation and the second violation, comprises:
   displaying a risk alert index value, an identity of the applications associated with the risk alert index value, and the information associated with the intercepted intents of the applications on the mobile device associated with the risk alert index value.

7. The method of claim 1, wherein displaying the risk alert includes one or a combination of: displaying a visual alert, producing an audible alert, producing a vibrating alert, displaying a list of options to a user of the mobile device to mitigate the risk alert.

* * * * *